United States Patent [19]

Bitler et al.

[11] Patent Number: 5,439,498
[45] Date of Patent: Aug. 8, 1995

[54] PROCESS AND SYSTEM FOR THE ON-SITE REMEDIATION OF LEAD-CONTAMINATED SOIL AND WASTE BATTERY CASINGS

[75] Inventors: John A. Bitler, Denver; John P. Baranski, Sinking Spring, both of Pa.

[73] Assignee: Exide Corporation, Reading, Pa.

[21] Appl. No.: 149,343

[22] Filed: Nov. 9, 1993

Related U.S. Application Data

[63] Continuation-in-part of Ser. No. 973,236, Nov. 10, 1992, Pat. No. 5,284,503.

[51] Int. Cl.$^6$ ............................................. C22B 13/02
[52] U.S. Cl. .................................... 75/10.19; 75/693; 266/87; 266/172
[58] Field of Search ................. 75/10.19, 693; 266/87, 266/172; 110/210

[56] References Cited

U.S. PATENT DOCUMENTS

| | | | |
|---|---|---|---|
| 1,492,241 | 4/1924 | Carpenter | 75/693 |
| 1,515,616 | 11/1924 | Popenhusen | 75/693 |
| 1,715,262 | 5/1929 | White | 75/693 |
| 2,049,633 | 8/1936 | Thomsen | 75/693 |
| 2,756,044 | 7/1956 | Neumann | 266/87 |
| 2,826,490 | 3/1958 | Neumann | 75/693 |
| 3,561,684 | 2/1991 | Fisher et al. | 75/693 |
| 4,102,676 | 7/1978 | Jarquay | 266/172 |
| 4,115,109 | 9/1978 | Libach et al. | 446/95 |
| 4,154,607 | 5/1979 | Wikman et al. | 75/77 |

(List continued on next page.)

FOREIGN PATENT DOCUMENTS 2106014 3/1994 Canada .

OTHER PUBLICATIONS

Royer et al, "Control Technologies for Remediation of Contaminated Soil and Waste Deposits at Superfund Lead Battery Recycling Sites", J. Air Waste Manage. Assoc., vol. 42, No. 7, pp. 970–980 (Jul. 1992).
Application of Plasma Technology in the Environmental Waste Processing Industry, CMP Report No. 92-5, Jul. 1992.
Eriksson, "The Plasmazinc Process for Recovery of Zinc from Primary and Secondary Materials", Zinc '85, Ch. 52, pp. 827–839 (1985).
Bygden et al, "Application of Kellogg's Model to the Slag-Funing Practive in Sweden", Zinc '85, Ch. 11, pp. 171–183 (1985).

(List continued on next page.)

*Primary Examiner*—Peter D. Rosenberg
*Attorney, Agent, or Firm*—Nixon & Vanderhye

[57] ABSTRACT

A mobile system for the remediation of a mixture of lead-contaminated soil and waste lead-acid battery casings includes a plasma arc furnace unit having a plasma arc torch which operates at a sufficiently elevated temperature to (i) convert the battery casings in the mixture into a combustible gas, (ii) volatilize lead contaminants which are present in the mixture and entrain the volatilized lead contaminants as a vapor in the combustible gas, and (iii) vitrify the soil, whereby lead contaminants that were present in the mixture are substantially removed therefrom. An internal combustion engine-driven generator supplies the plasma arc furnace with electrical power. In this regard, the internal combustion engine-driven generator receives the combustible gas from the plasma arc furnace as a fuel source in order to drive the generator. A lead-filtration unit is preferably interposed between the generator and the plasma arc furnace so as to receive the combustible gas generated by the plasma arc furnace and remove the entrained lead contaminants therefrom. A supply of secondary fuel gas (e.g., liquified petroleum gas, natural gas or the like) may optionally be supplied to the internal combustion engine-driven generator as a supplemental fuel together with the combustible gas generated by the plasma arc furnace. The various nit operations may be mounted for mobility (e.g., on truck beds, rail cars or the like) to permit transportation to a landfill in need of remediation.

19 Claims, 2 Drawing Sheets

U.S. PATENT DOCUMENTS

| | | | |
|---|---|---|---|
| 4,180,251 | 12/1979 | Jaquay | 266/172 |
| 4,229,271 | 10/1980 | Prengaman et al. | 204/114 |
| 4,310,351 | 1/1982 | Lieberman | 75/77 |
| 4,340,421 | 7/1982 | Bergsoe | 75/77 |
| 4,571,261 | 2/1986 | Buren et al. | 75/77 |
| 4,877,640 | 10/1989 | Muehlberger et al. | 75/10.19 |
| 5,122,181 | 6/1992 | Dube et al. | 75/10.21 |
| 5,203,908 | 4/9193 | Lindsay et al. | 75/10.35 |
| 5,230,292 | 7/1993 | Workman et al. | 110/210 |

OTHER PUBLICATIONS

Bunney et al, "The Commercial Development of Plasma Technology: EAF Dust Application", AIME Conference, San Diego, Mar., 1992.

Penberthy, "Why Glass is a Good Host for Hazardous Waste", Glass Industry, pp. 22–24 (May 1992).

Roy, "Cyclone Furnace Destroys Organics, Immobilizes Heavy Metals, Radionuclides", Hazmat World, pp. 59–60 (Aug. 1992).

Wang et al, "Recovering Zn, Pb, Dc, and Fe from Electric Furnace Dust", JOM, pp. 42–45 (Apr. 1990).

"Plasma Arcs Sputter New Waste Treatment", Chem. Engineering, pp. 32–33 (Dec. 1991).

Recovering Lead from Contaminated Solids, The Hazardous Waste Consultant, pp. 1.22–1.24, Sep./Oct., 1991.

Plasma Gasification Could Set New Standards for Municipal Solid Waste Disposal, EnerSearch, Ontario Ministry of Energy.

PROCESS AND SYSTEM FOR THE ON-SITE REMEDIATION OF LEAD-CONTAMINATED SOIL AND WASTE BATTERY CASINGS

CROSS-REFERENCE TO RELATED APPLICATION

This application is a continuation-in-part of commonly owned U.S. patent application Ser. No. 07/973,236 filed on Nov. 10, 1992, now U.S. Pat. No. 5,284,503, in the name of John A. Bitler et al and entitled "Process for Remediation of Lead-Contaminated Soil and Waste Battery Casings", the entire content of which is expressly incorporated by reference hereinto.

FIELD OF INVENTION

The present invention relates generally to a process for the remediation of lead-contaminated soil and waste battery casings. More specifically, this invention relates to a novel process whereby a mixture of lead-contaminated soil and battery casings may be pyrolyzed in a plasma arc furnace so as to volatilize the battery casings to form a combustible CO gas that is then supplied as a primary fuel to a conventional smelting furnace. A major proportion of the lead contaminant is likewise volatilized and transferred along with the combustible gas to the smelting furnace where it can then be subjected to conventional lead-recovery techniques. The soil, on the other hand, forms a vitrified slag in the plasma arc furnace and thereby serves as a non-toxic and non-leachable host matrix for any minor proportion of lead that is either not volatilized or removed from the plasma arc furnace in a molten form.

BACKGROUND AND SUMMARY OF THE INVENTION

The safe treatment and disposal of all waste materials is demanded in most developed nations. In this regard, there is a growing demand on industry by environmentalists and government agencies to alleviate potentially toxic and/or contaminated waste disposal sites that were employed for many years prior to the public's heightened environmental concerns and the enactment of environmental legislation.

For example, a number of now defunct lead-acid battery recycling sites were operated where lead was reclaimed from spent lead-acid batteries. At most such lead-acid battery recycling sites, the primary operation consisted of breaking the battery case, draining the spent acid, and separating the battery cases from the commercially valuable lead to be recycled. The broken battery cases, which were at that time formed of a non-recyclable, hardened rubber material known in art parlance as "ebonite", were of no commercial value and were thus typically discarded as landfill waste. However, it is now known that these discarded battery cases in landfills nonetheless were contaminated with sufficient quantities of lead that could detrimentally affect the environment.

Various techniques have been proposed for the remediation of landfills containing lead-contaminated waste lead-acid battery casings. For example, The U.S. Bureau of Mines has proposed a chemical reclamation process for waste lead-acid battery casings whereby battery casing particles are carbonized by treatment in a sodium or ammonium carbonate solution followed by acid washing with nitric acetic or flurosilicic acids. See, "The Hazardous Waste Consultant", September/October 1991, pages 1.22–1.24.

Simply immobilizing the lead contamination at landfills has been identified as one possible option recently by Royer et al, "Control Technologies for Remediation of Contaminated Soil and Waste Deposits at Superfund Lead Battery Recycling Sites", Journal of Air & Waste Management Association, Volume 42, No. 7, pgs. 970–980 (July 1992). However, the authors indicate that immobilization by vitrification would be unsuitable due to the combustible nature of the casings.

It would therefore undoubtedly be desirable for a process to be proposed whereby landfill materials containing both lead-contaminated soil and waste lead-acid battery casings could be treated so as to ameliorate the environmental concerns posed by such landfill materials. Furthermore, it would be desirable if a system was provided which could be readily transported to a landfill site of waste lead-acid battery casings so that remediation of the lead-contaminated soil could be accomplished on-site (i.e., as opposed to shipping the lead-contaminated soil to an off-site remediation facility). It is towards providing such processes and systems that the present invention is directed.

Broadly, the present invention is especially characterized in the treatment of lead-contaminated soil and battery casings using a plasma arc furnace which pyrolyzes the soil and waste battery casings so as to form a vitrified slag and a combustible gas, respectively. The combustible gas (which contains predominantly carbon monoxide) along with volatilized heavy metals (of which lead predominates) is directed to, and used as, a primary fuel by a conventional lead smelting furnace. The volatilized lead that is entrained in the combustible gas is thus transferred thereby to the lead recovery and environmental protection/control equipment associated with the smelting furnace. The soil, on the other hand, is converted into a non-toxic (i.e., according to the Toxicity Characteristic Leaching Procedure (TCLP) published in the Federal Register on Mar. 29, 1989, the entire content of which is expressly incorporated hereinto by reference) vitrified slag by the plasma arc which may be crushed and used as a commercial material (e.g., roadway aggregate, asphalt filler material or the like) or simply transferred to a landfill where it poses no environmental threat.

Furthermore, such plasma arc furnace and associated process equipment (e.g., generators, time scrubbers, and the like) may be mounted on mobile platforms (e.g., truck beds, rail cars, and the like) so as to be transportable to a battery casing landfill. The plasma arc furnace and associated equipment may then be operatively interconnected with one another and operated on-site until the landfill remediation is completed, significantly, the combustible gas which is generated in the plasma arc furnace may be employed as a fuel for electrical generators which supply the electrical power necessary for the plasma arc furnace. As such, the transportable on-site remediation system of this invention can be self-contained—i.e., will not necessarily need any externally supplied utilities.

Further aspects and advantages of this invention will become apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings wherein like reference numerals throughout the various FIGURES denote like elements, and wherein FIG. 1 schematically depicts a flow diagram for a particularly preferred process scheme according to this invention; and FIG. 2 is a schematic representation for a transportable, on-site remediation system according to this invention.

DETAILED DESCRIPTION OF THE PREFERRED EMBODIMENTS

Figure 1:
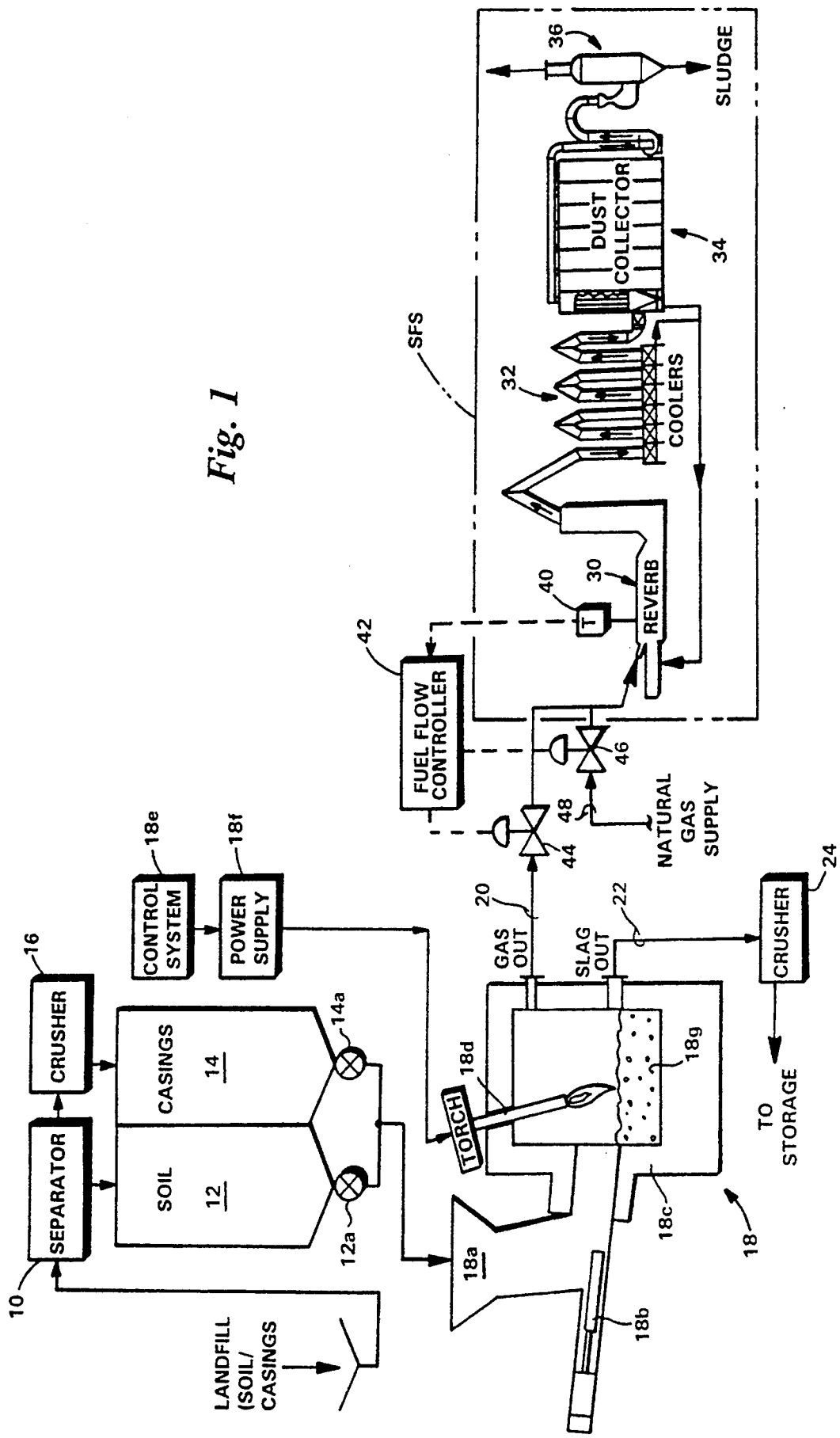

The accompanying FIG. 1 depicts a particularly preferred process flow diagram according to the present invention. In this connection, although the process depicted in the accompanying FIG. 1 operates on a batchwise basis, continuous processing of the lead-contaminated soil/battery casings according to this invention could equally be envisioned.

The soil and battery casing constituents of the landfill material are separated from one another by any suitable mechanical separatory technique (e.g., differential specific gravity apparatus, vibratory or non-vibratory screens, and the like) schematically identified as separator 10 in FIG. 1. The soil component is transferred to a soil hopper 12, while the battery casing component is transferred to a casing hopper 14. Prior to being deposited into the hopper 14, however, the casings are most preferably crushed to a suitable size (e.g., average particle size between 0.375 inch to 0.5 inch) by a crusher 16.

The soil and casings hoppers 12, 14 are provided with flow control valves 12a, 14a, respectively, so as to meter a batch charge having a predetermined ratio of soil to casings to the input hopper 18a of plasma arc furnace 18. Control of the valves 12a, 14a so as to meter the appropriate amounts of soil and casings, respectively, can be accomplished in any convenient manner, such as, by load scales associated with the hoppers 12, 14 and/or the furnace 18 which supply an input signal to a flow controller for the valves 12a, 14a.

It will be understood that the battery casings which are typically associated with lead-contaminated landfills are formed of a hardened rubber composite material conventionally called "ebonite". The composite hardened rubber material can be a synthetic rubber (e.g., styrene-butadiene cross-linked with sulfur) having upwards of 40% of a carbonaceous material, such as anthracite coal or carbon black as a filler material. However, the present invention may equally be applied to landfills which may contain waste battery casings formed from a more modern polyolefinic resin (e.g., polypropylene).

The battery casings may be characterized as a solid organic material, whether formed of the discontinued ebonite material or the more modern polyolefinic material. It will therefore be understood that the greater the amount of casings in the batch charge to the plasma arc furnace 18, the greater the amount of combustible CO gas that will be produced by pyrolyzing the casings. Thus, since the combustible gas that is generated by pyrolyzing the casings is intended to be used as the primary fuel for a conventional smelting furnace system (as will be described in greater detail below), the preferred ratio of soil to casings is determined in large part by the fuel requirements of the smelting furnace system. By way of example, a smelting furnace (or other equipment intended to combustibly consume the combustible gas generated by the plasma arc furnace according to this invention) having a fuel requirement of $30 \times 10$ BTU/hr will typically dictate a soil to casings weight ratio of between about 7:1 to 5:1 being fed to the plasma arc furnace 18 in order to supply 100% of such fuel requirement.

The particular type of plasma arc furnace 18 which is employed in the practice of this invention is not particularly critical, provided that it can pyrolyze the waste battery casings. Thus, either transfer or non-transfer types of plasma arcs may be employed. Similarly, the ionizing gas that may be employed to generate the plasma arc can be any that is conventionally used for such purpose, such as, compressed air, nitrogen and/or argon.

In the accompanying FIG. 1, the plasma arc furnace 18 is depicted as being a conventional batch non-transfer plasma arc type. However, as indicated previously, a transfer plasma arc type furnace could be employed, if desired. Also, the furnace 18 could be continuously operated, e.g., by providing a continuous supply of soil/casings into the furnace, and continuously removing the formed vitrified slag therefrom.

The batch plasma arc furnace 18 depicted in the accompanying FIG. 1 most preferably includes a hydraulic feeding ram 18b which serves to force the batch charge transferred from the hoppers 12 and 14 into the crucible 18c where it is pyrolyzed by the torch 18d. The plasma torch 18d is connected to a suitable control system 18e and direct current power supply 18f (preferably rated at at least about 350 volts and 400 amps) so as to generate a plasma flame which contacts the batch charge (noted by reference numeral 18g) in the crucible 18c.

It may be desirable to include a flux material with the mixture of soil and casings charged to the furnace 18, particularly when acidic soil is encountered, in order to reduce the soil melting point and thereby enhance its vitrification. Suitable fluxes may be, for example, blast furnace slag and/or limestone, and may be used in relatively minor quantities. e.g., up to 10 wt. %, more preferably, between about 5 to 10 wt. % of the furnace charge. In addition, the charge to the furnace can conveniently be converted to reduction conditions by the addition of a carbon source (e.g., coke breeze, coal or the like) in suitable quantities.

In order to ensure that the lead-contaminated battery casings are completely pyrolyzed by the flame of the plasma arc torch 18d, it is preferred that the batch charge 18g be agitated during its pyrolysis. Agitation can be accomplished utilizing mechanical agitators within the crucible 18c. However, since the temperature of the flame created by the plasma arc torch 18d, is typically between 4,000° to 8,000° C. or greater, agitation of the batch charge 18g may conveniently be obtained by oscillating the plasma arc torch 18d itself using suitable motor and mounting structures for the torch 18d. Oscillation of the plasma arc torch 18d will thus direct the flame along the surface of the batch charge 18g and thereby create internal flow agitation therewithin. Alternatively, agitation of the molten furnace charge may occur naturally by virtue of electrical conductance vectors of the torch.

The combustible gas which results from pyrolyzing the battery casings and the vaporized lead (as well as other vaporized metal contaminants in the soil/casings mixture) entrained thereby are transferred via line 20 to the smelting furnace system SFS. The vitrified slag, on the other hand, may be transferred via line 22 to a crusher 24 so that it may be broken into a particulate of selected size. The vitrified slag is non-toxic (i.e., since it does not test out of limits according to Toxicity Characteristic Leaching Procedure) and provides a host matrix for lead (or any other heavy metal) not volatilized during plasma arc furnace pyrolysis. Thus, the vitrified slag may be returned to a landfill without risk of environmental concerns or may be transferred to a storage site for later use as a commercial product (e.g., roadway aggregate, asphalt fill material, and the like).

As noted previously, the combustible gas resulting from pyrolyzing the battery casings is transferred to a smelting furnace system SFS which is conventionally employed in lead-smelting operations. The smelting furnace system SFS thus typically is comprised of a smelting furnace 30 (which may be a reverbatory type furnace as is shown in the accompanying FIGURE) and downstream environmental control equipment, such as a cooler section 32 (which condenses any volatilized lead not recovered in the furnace 30), dust collector section 34 (which traps finely divided lead-contaminated particulates), and a final gas scrubbing section 36. The particulates recovered from the cooler and dust collector sections 32. 34, respectively, are recycled to the inlet of the smelting furnace 30 to recover substantially all lead.

The smelting furnace 30 is fueled primarily by the combustible gas formed by the pyrolysis of the battery casings in the plasma arc furnace 18. However, there may be instances where the thermal capacity of the combustible gas transferred via line 20 is insufficient to fuel the smelting furnace properly. Thus, the smelting furnace is provided according to this invention with a temperature probe 40 which measures the temperature in the furnace's combustion chamber. The temperature signal supplied by the temperature probe is fed to a fuel flow controller 42 which compares the measured temperature against a temperature set-point and issues appropriate output signals to flow control valves 44, 46, associated with combustible gas line 20 and with a natural gas supply line 48, respectively. As a result, when the temperature probe 40 detects inadequate temperature existing within the combustion chamber of the furnace 30 (indicative of inadequate combustion properties and/or inadequate flow of combustible gas introduced via line 20), the fuel flow controller 42 will then increase the flow of natural gas to the furnace 30 from supply line 48 so as to supplement flow of combustible gas in line 20. In such a manner, the furnace 30 is maintained in continuous operation, even though the plasma arc furnace (and its lead-contaminant remediation functions) are conducted in a batch-wise manner.

As noted briefly above, the remediation process described in connection with FIG. 1 may be embodied in a mobile system which can be transported easily to a waste lead-acid battery casing landfill and operated onsite until the landfill remediation is complete. A particularly preferred mobile remediation system 100 is depicted in accompanying FIG. 2. As is shown, the remediation system 100 will necessarily include a plasma arc furnace 18 as described above. However, in the interests of mobility and self-contained operation, the plasma arc furnace 18 will be supplied with electrical power by one or more electrical generators 102a–102c driven by internal combustion engines 104a–104c, respectively. In this regard, the electrical power will be directed to a control unit CU so as to control the supply of electrical power generated by the generators 102a–102c to the plasma arc furnace 18.

The combustible gas which is generated by the plasma arc furnace 18 may first be passed through a heat exchanger 105 and then through a suitable filtration sub-system 106 so as to remove volatilized lead contaminants entrained in the gas. The scrubber sub-system 106 may thus include a cooler, dust collector and flue scrubber to remove the volatilized lead contaminant from the stream of combustible gas discharged from the furnace 18. The combustible gas may then be provided as a fuel supply via lines 107 and 109 to one or more of the combustion engines 104a–104c (e.g., depending upon the power supply needs of the plasma arc furnace). In the event that the thermal content of the combustible gas generated by the plasma arc furnace 18 is insufficient in order to properly power the internal combustion engines 104a–104c, however, a supplemental fuel such as liquified natural gas, propane or the like from source 110 may be mixed with the combustible gas at valve 112 and then supplied to the internal combustion engines 104a–104c via line 109. In the event that the self-contained power supplied by the electrical generators 102a–102c is not needed on-site (i.e., due to the availability of on-site electrical power), then the valve 114 at the junction of lines 107 and 109 may simply be positioned so that the combustible gas is directed to an ignitor 116 which burns the combustible gas in the ambient atmosphere with an appropriate scrubber 117.

Figure 2:
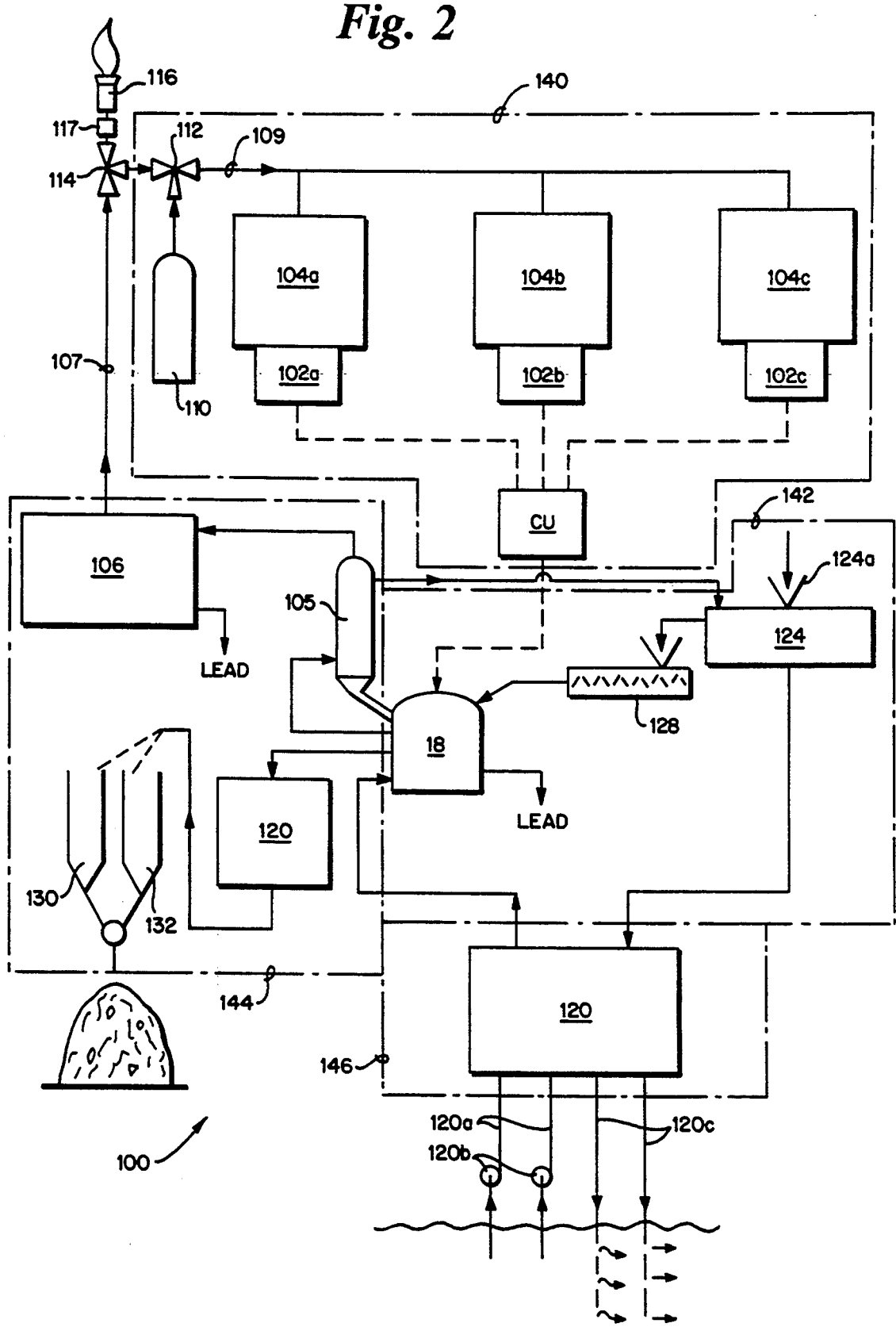

Cooling of the plasma arc furnace 18 in the system 100 shown in FIG. 2 is most preferably self-contained, that is, it is preferred that the plasma arc furnace 18 be cooled by readily transportable means. If a supply of water is readily available, then the cooling sub-system is most preferably comprised of a heat exchanger unit 120 having intake conduits 120a and associated pumps 120b to supply cooling water and discharge conduits 120c to return water to its source (which as depicted in FIG. 2, may be a natural body of water such as a stream, lake or the like).

The cooling water from the exchanger unit 120 is directed to an external cooling jacket (not shown) associated with the plasma arc furnace 18. Upon leaving the cooling jacket of the plasma arc furnace 18, therefore, the water may be directed to the heat exchanger 105 associated with the scrubber sub-system 106 to serve as a preliminary heat-exchange fluid with the significantly hotter combustible gas. The heated liquid will then be transferred to the soil preparation subsystem 124 where the heat may be employed to dry the lead-contaminated soil from the landfill introduced into hopper 124a. Thus, the outlet temperature of the water discharged from the soil preparation subsystem 124 will be less as compared to the inlet water temperature. As a result, this remaining heat may be extracted from the water discharged from the soil preparation subsystem 124 by heat-exchange with the cooling water taken from the supply by means of the heat exchanger unit 120. Water which is returned to the natural source will therefore not be at an appreciably high temperature which would cause environmental concerns for fish and/or wildlife in the vicinity of the remediation system.

As noted above, the soil/battery casing mixture will first be supplied to the soil preparation subsystem 124 where it will be dried, comminuted via crusher 128 and then supplied the plasma arc furnace 18. After processing in the furnace, the now vitrified soil (termed "slag") will be transferred to a slag processing unit 120 where it will be crushed, screened and sized and the like. The resulting processed slag may then be returned to the landfill site and/or sorted by size in hoppers 130, 132 and collected for sale as a usable product (e.g., roadway aggregate, etc.).

The various units may be mounted onto mobil platforms as shown by the double dash line representations in FIG. 2. That is, the electrical power generation system may be mounted onto a mobile platform designated by double dashed line 140; the plasma furnace 18 and soil preparation subsystems 124/128 may be mounted on a mobile platform as noted by the double dashed line 142; the heat exchanger 105, scrubber 106 and slag processing units 120 may be mounted on a mobile platform 144; and the heat exchange system 120 mounted on a mobile platform 146. Of course, the number of mobile platforms and the individual unit operations supported thereby is dependent upon a variety of factors, for example, the size of the mobil remediation unit 100 and its processing capacity. Preferably, the mobil platforms 140, 142, 144 and 146 will be truck beds due to the relative ease of transporting the equipment overland and the ability to access remote landfill sites. However, as those in this art can appreciate, other means of self-contained mobility (e.g., rail cars) could likewise be employed.

Although the invention has been described above as being especially well suited to the remediation of soil containing waste lead-acid battery casings, it may usefully be employed in the remediation of landfill materials generally. That is, the present invention could usefully be employed in the remediation of landfills in which waste materials, such as waste paper and/or paperboard products, various metals, hydrocarbon fuels and/or chemical feedstocks, plastics materials or the like, are mixed with landfill soil.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mobile system for the remediation of a mixture of lead-contaminated soil and waste lead-acid battery casings comprising:
   a plasma arc furnace having a plasma arc torch which operates at a sufficiently elevated temperature to (i) convert the battery casings in the mixture into a combustible gas, (ii) volatilize lead contaminants which are present in the mixture and entrain said volatilized lead contaminants as a vapor in the combustible gas, and (iii) vitrify the soil, whereby lead contaminants that were present in the mixture are substantially removed therefrom;
   an internal combustion engine-driven generator operatively coupled to said plasma arc furnace for supplying said plasma arc furnace with electrical power; and
   a transfer line which connects said plasma arc furnace to said internal combustion engine-driven generator so as to direct combustible gas generated by said plasma arc furnace to said internal combustion engine-driven generator, wherein said internal combustion engine-driven generator receives the combustible gas from said plasma arc furnace as a fuel source and combusts the combustible gas in order to drive the generator.

2. A mobile system as in claim 1, further comprising a lead-filtration unit which interposed between said generator and said plasma arc furnace, said lead-filtration unit receiving the combustible gas generated by the plasma arc furnace and removing the entrained lead contaminants therefrom.

3. A mobile system as in claim 1, further comprising a supply of secondary fuel gas which is supplied to said combustion engine-driven generator as a supplemental fuel together with said combustible gas generated by said plasma arc furnace.

4. A mobile system as in claim 1, further comprising a soil preparation unit which includes a soil drier for drying the mixture of soil and waste battery casings prior to being supplied to said plasma arc furnace unit.

5. A mobile system as in claim 1, further comprising a slag processing unit for processing the vitrified soil discharged from the plasm arc furnace unit.

6. A mobile system as in claim 5, wherein said slag processing unit includes a crusher for comminuting the vitrified soil.

7. A mobile system as in claim 6, wherein said slag processing unit includes a screen for sizing the comminuted vitrified soil.

8. A process for the remediation of lead-contaminated soil and waste lead-acid battery casings comprising the steps of:
   (a) feeding a mixture of lead-contaminated soil and waste lead-acid battery casings into an electrically powered plasma arc furnace;
   (b) pyrolyzing the mixture in the plasma arc furnace by bringing the mixture into contact with a plasma arc torch at a sufficiently elevated temperature to (i) convert the battery casings in the mixture into a combustible gas, (ii) volatilize lead contaminants which are present in the mixture and entrain said volatilized lead contaminants as a vapor in the combustible gas, and (iii) vitrify the soil, whereby lead contaminants that were present in the mixture are substantially removed therefrom;
   (c) transferring the combustible gas to an internal combustion engine which drives an electrical power generator and then combusting the combustible gas as a fuel source within said internal combustion engine to cause said generator to generate electrical power; and
   (d) supplying said generated electrical power from said generator to said plasma arc furnace as a source of electrical power therefor.

9. A process as in claim 8, further comprising the step of removing the vaporized lead contaminants entrained in said combustible gas prior to supplying said combustible gas to said internal combustion engine of said electrical power generator.

10. A process as in claim 8, wherein step (c) includes supplying a supplemental fuel to said internal combustion engine together with said combustible gas.

11. A process as in claim 10, wherein said supplemental fuel is liquefied petroleum gas or natural gas.

12. A process as in claim 8, wherein said battery casings are crushed prior to being fed into the plasma arc furnace.

13. A process as in claim 12, wherein said battery casings are crushed to achieve an average particle size of between 0.375 to 0.5 inch.

14. A process as in claim 8, wherein step (a) is practiced such that a weight ratio of soil to battery casings of between 7:1 to 5:1 is fed to the plasma arc furnace.

15. A process as in claim 8, wherein step (b) includes agitating the mixture of lead-contaminated soil and waste lead-acid battery casings during pyrolysis by the plasma arc furnace.

16. A method as in claim 15, wherein said step of agitating the mixture includes subjecting the mixture to mechanical agitation.

17. A method as in claim 15, wherein said step of agitating the mixture includes oscillating the plasma arc torch relative to the mixture during pyrolysis.

18. A system for the remediation of a mixture of waste-contaminated soil comprising:
   a plasma arc furnace having a plasma arc torch which operates at a sufficiently elevated temperature to (i) convert the waste in the mixture into a combustible gas, and (ii) vitrify the soil;
   an internal combustion engine-driven generator operatively coupled to said plasma arc furnace for supplying said plasma arc furnace with electrical power; and
   a gas transfer line which connects said plasma arc furnace to said internal combustion engine-driven generator so as to direct combustible gas generated by said plasma arc furnace to said internal combustion engine-driven generator, wherein said internal combustion engine-driven generator receives the combustible gas from said plasma arc furnace as a fuel source and combusts the combustible gas in order to drive the generator.

19. A process for the remediation of waste-contaminated soil comprising the steps of:
   (a) feeding a mixture of waste-contaminated soil into an electrically powered plasma arc furnace;
   (b) pyrolyzing the mixture in the plasma arc furnace by bringing the mixture into contact with a plasma arc torch at a sufficiently elevated temperature to (i) convert the waste in the mixture into a combustible gas, and (ii) vitrify the soil;
   (c) transferring the combustible gas to an internal combustion engine which drives an electrical power generator and then combusting the combustible gas as a fuel source within said internal combustion engine to cause said generator to generate electrical power; and
   (d) supplying said generated electrical power from said generator to said plasma arc furnace as a source of electrical power therefor.

* * * * *